United States Patent [19]
Stoneburner et al.

[11] Patent Number: 5,993,652
[45] Date of Patent: Nov. 30, 1999

[54] SELF-CLEANING STRAINER HAVING ROTATING STRAINER FRAME ASSEMBLY JOURNALED ON CENTRAL CORE BY SETS OF WHEELS

[75] Inventors: James O. Stoneburner; Charles A. Wilkins; Thomas R. Wilkins, all of Ann Arbor, Mich.

[73] Assignee: Perfection Sprinkler Co., Ann Arbor, Mich.

[21] Appl. No.: 09/098,757

[22] Filed: Jun. 17, 1998

[51] Int. Cl.⁶ .................................................. B01D 33/073
[52] U.S. Cl. .......................... 210/170; 210/232; 210/393; 210/411; 210/416.1; 210/460
[58] Field of Search ..................... 210/106–108, 210/170, 232, 315, 391, 393, 409, 411, 416.1, 459, 460, 499, 489

[56] References Cited

U.S. PATENT DOCUMENTS

| | | |
|---|---|---|
| 1,398,664 | 11/1921 | Armstrong . |
| 3,762,563 | 10/1973 | Petersen . |
| 3,936,378 | 2/1976 | Kawada . |
| 4,717,478 | 1/1988 | Shiraki et al. . |
| 4,822,486 | 4/1989 | Wilkins et al. . |
| 5,108,592 | 4/1992 | Wilkins et al. . |
| 5,215,656 | 6/1993 | Stoneburner . |
| 5,330,065 | 7/1994 | Bradley . |
| 5,356,532 | 10/1994 | Wilkins et al. . |
| 5,370,791 | 12/1994 | Lescovich et al. . |
| 5,401,396 | 3/1995 | Lescovich et al. . |
| 5,520,808 | 5/1996 | Stoneburner et al. . |
| 5,772,879 | 6/1998 | Jaikaran . |

*Primary Examiner*—David A. Simmons
*Assistant Examiner*—Fred Prince
*Attorney, Agent, or Firm*—George L. Boller

[57] ABSTRACT

A novel all-wheel journaling of the rotary portion of a rotary self-cleaning strainer on a stationary central core. Respective sets of circumferentially spaced wheels are provided on respective end closures of the rotary portion that close opposite axial ends of a strainer screen to the central core. A first set of wheels on one end closure rides on a wear sleeve around the suction pipe of the stationary core, and a second set on the other end closure rides on a ring disposed around the supply pipe of the stationary core. Two additional rings sandwich the ring on the supply pipe to axially capture the second set of wheels and thereby axially capture the rotary portion on the central core. The rotary portion has a frame, including the end closures, for supporting the screen. Novel tie rod structures extend between the end closures.

20 Claims, 5 Drawing Sheets

SELF-CLEANING STRAINER HAVING ROTATING STRAINER FRAME ASSEMBLY JOURNALED ON CENTRAL CORE BY SETS OF WHEELS

FIELD OF THE INVENTION

This invention relates to a rotary self-cleaning strainer.

BACKGROUND AND SUMMARY OF THE INVENTION

When water is to be pumped out of an outdoor pit, reservoir, or canal, it is important to prevent debris, such as leaves, sticks, discarded plastic and paper articles, stones, etc., from entering the pump. Rotary self-cleaning strainers that contain cylindrical screens for performing the straining function are often used for this purpose.

The strainer is attached to the end of a conduit and placed in the body of water that is to be pumped. The pump is operated to suck water through the strainer and conduit, as the strainer screen prevents debris from being sucked into the conduit along with the water. Certain debris may adhere to the screen's exterior due to the pump suction force. However, the continued adherence of such debris to the screen's exterior, and resulting impairment of flow through the screen, are prevented by rotating the screen past a nozzle structure which is disposed on the interior of the screen and directs water outwardly through the screen to dislodge the debris. The water is fed under pressure to the strainer through a separate supply line which may be tapped into the pump's outlet. The water acts on only a limited circumferential zone of the screen at any given time to force adhering debris away from the exterior of the screen as the screen revolves past the nozzle structure. The remainder of the screen serves to pass the flow of water that is being sucked by the pump.

Commonly assigned U.S. Pat. Nos. 4,822,486; 5,108,592; 5,215,656; 5,356,532; 5,520,808 disclose new and improved rotary self-cleaning strainers of this general type. One feature of these strainers is the use of nozzles directed to eject pressurized water against the cylindrical screen to rotate the rotary portion of the strainer and simultaneously dislodge adhering debris from the exterior of the screen.

Annular end closure disks close the opposite axial ends of a rotary portion of the strainer to the non-rotating central core of the strainer. The core comprises a suction pipe through which water from the source being pumped is sucked out of the strainer, and a supply pipe that extends coaxially within the suction pipe to deliver pressurized water to the nozzles that are disposed at the radially outer ends of branch pipes which are threaded into the wall of the supply pipe. These end closure disks are rigid plastic. An axial end of the rotary portion may be closed to the suction pipe by either a single disk, or by a stack of plural disks. Mounted on these annular end closure disks are means providing for the journaling of the rotary portion on the non-rotating central core about the strainer's longitudinal axis.

In certain of these referenced patents the journaling of the upper end closure to the suction pipe is provided by a series of identical diameter wheels that are mounted on the lower face of the upper annular end closure to rotate about axes that are parallel with the strainer's longitudinal axis. For example, in one of the referenced patents there are four such wheels at ninety degree intervals around the axis of the strainer, defining an imaginary circle that is concentric with the strainer axis and slightly smaller than the inside diameter (I.D.) of the annular end closure such that the wheels just touch the outside diameter (O.D.) of the suction pipe. In two of the referenced patents, an annular seal is mounted on and sealed against the upper face of the upper end closure around the margin of its I.D. In radial cross section this seal has a lip that curves into sealing contact with the O.D. of the suction pipe. The lower end closure is journaled on the lower end of the central core, but the journaled surface of the central core is not the O.D. of the suction pipe.

One aspect of the present invention relates to a rotary self-cleaning strainer that can be fabricated with improved economy and that can exhibit improved operational performance. By utilizing all-wheel journaling, greater use is made of common parts, such as journal wheels and bushings, and special sealing arrangements, such as lip-type seals and stacks of sealing disks like those shown in certain of the referenced patents, can be eliminated. The disclosed all-wheel journaling is believed also to provide less frictional resistance, thereby making the inventive strainer more efficient to operate. Such improved efficiency offers the potential for effective usage with lower pressure pumps. Since pump pressures available at certain sites where the strainers are used are sometimes limited, the inventive strainer offers the opportunity for usage at such sites, thereby providing more widespread usage for such strainers.

PVC pipe is useful for both suction and supply pipes. In certain uses of strainers described in one or more of the above-referenced patents, it has been observed that the journal wheels on the upper end closure may eventually cause wear on the PVC suction pipe. A result is that the journaling becomes looser. It is believed that a strainer embodying principles of the present invention can reduce this type of wear and loosening by providing around the PVC suction pipe, a wear sleeve on which the upper end closure journal wheels ride.

Another aspect of the invention relates to elimination of the supply pipe end closure cap as a device for also securing the lower end closure and seal on the strainer. Therefore, a seal between the supply pipe and the lower end closure becomes unnecessary, and tightening of the supply pipe end closure cap is precluded from having any effect on the lower end closure.

Still another aspect of the invention relates to the construction of the frame that supports the strainer screen, including the end closures and tie rod structures that join the end closures in assembly. By utilizing several disks assembled together, an end closure may be fabricated by cutting each of the individual disks from flat sheet material. The tie rod structures can be accurately located and securely related to the end closures without the necessity of machining counterbores in the end closures. Structural strength can be increased by including one or more rings in association with the tie rod structures between the end closures.

The foregoing features, advantages, and benefits of the invention, along with additional ones, will be seen in the ensuing description and claims which are accompanied by drawings. The drawings disclose a presently preferred embodiment of the invention according to the best mode contemplated at this time for carrying out the invention.

DESCRIPTION OF THE PREFERRED EMBODIMENT

Figure 1:
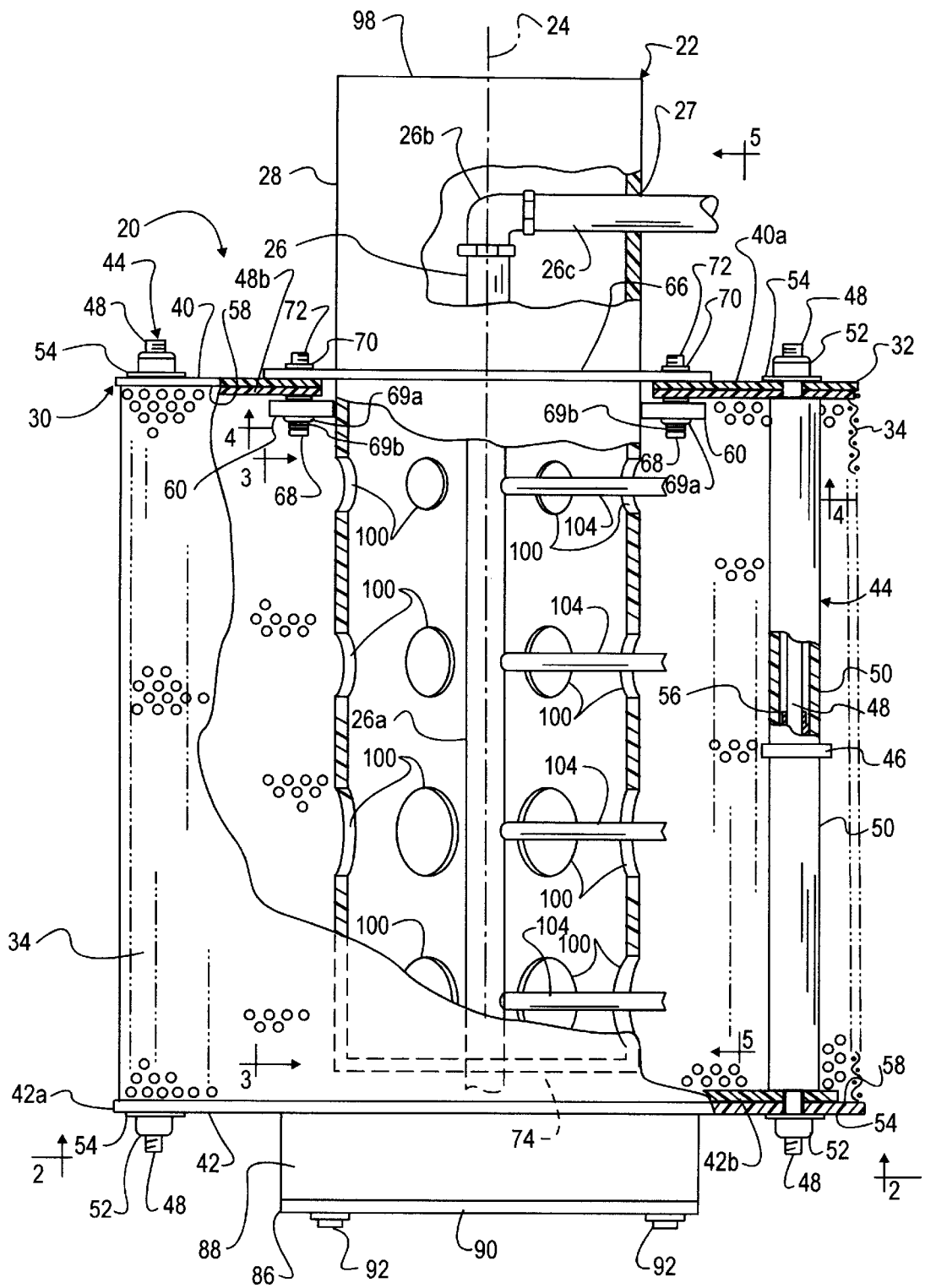
FIG. 1 is a longitudinal view, partly in cross section having certain portions removed for illustrative clarity, through a rotary self-cleaning strainer embodying principles of the invention.
Figure 2:
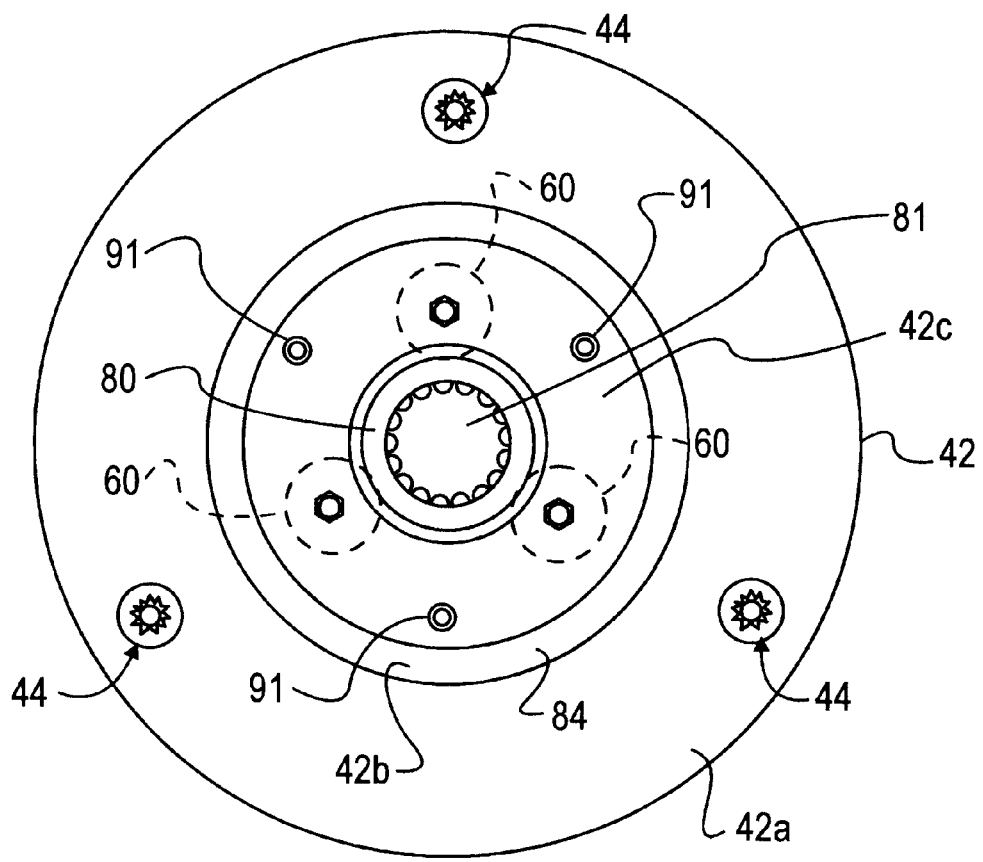
FIG. 2 is a end view, on a reduced scale, in the direction of arrows 2—2 in FIG. 1.
Figure 4:
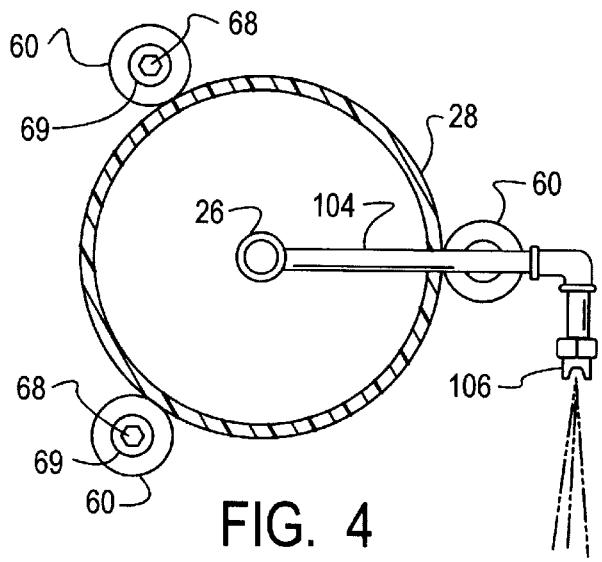
FIG. 4 is a transverse cross sectional view in the direction of arrows 4—4 in FIG. 1.
Figure 3:
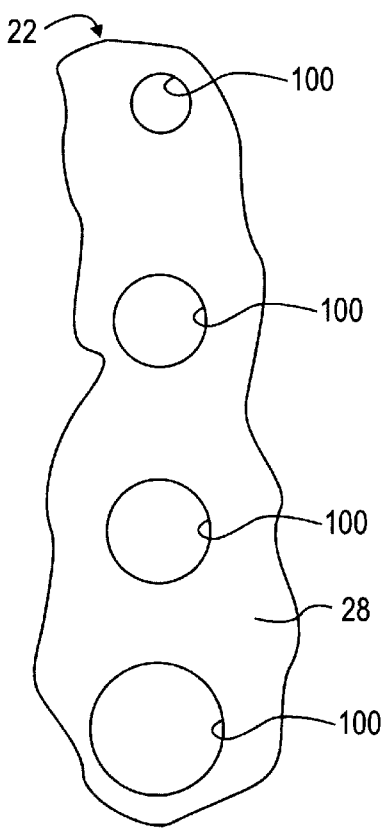
FIG. 3 is a fragmentary view in the direction of arrows 3—3 in FIG. 1.
Figure 5:
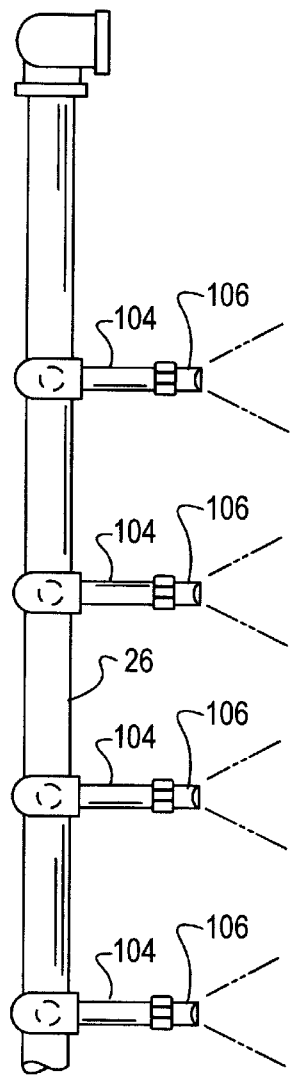
FIG. 5 is a fragmentary view in the direction of arrows 5—5 in FIG. 1.
Figure 6:
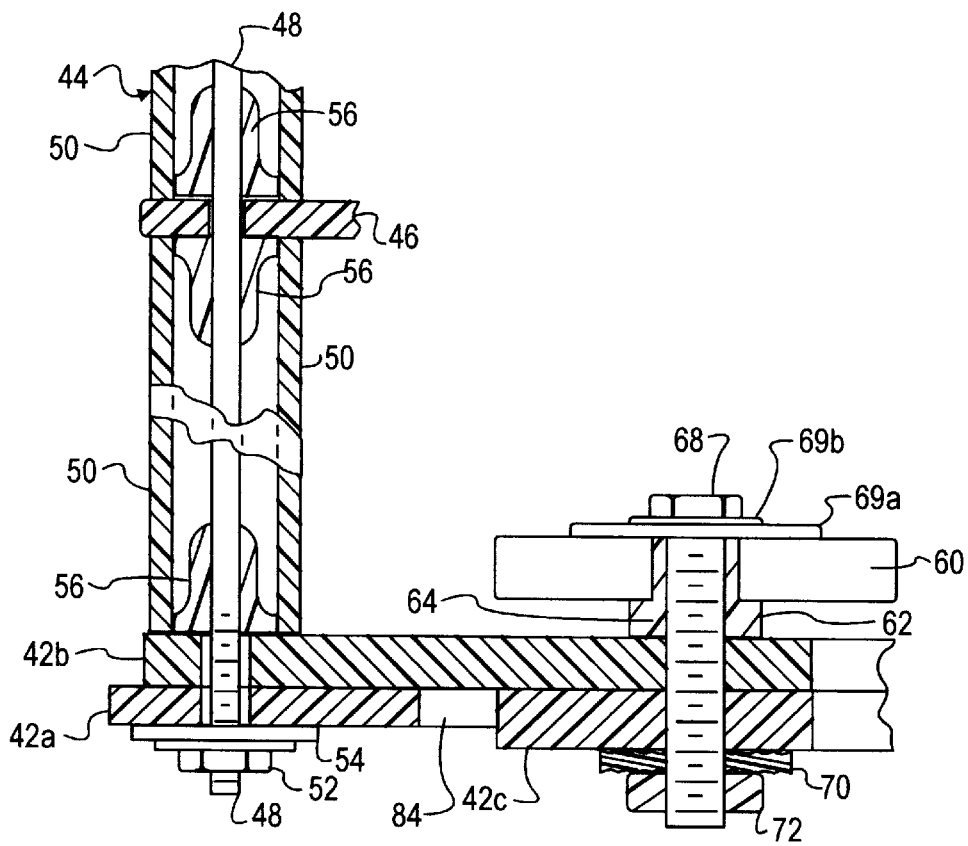
FIG. 6 is an enlarged view of a portion of FIG. 1.
Figure 7:
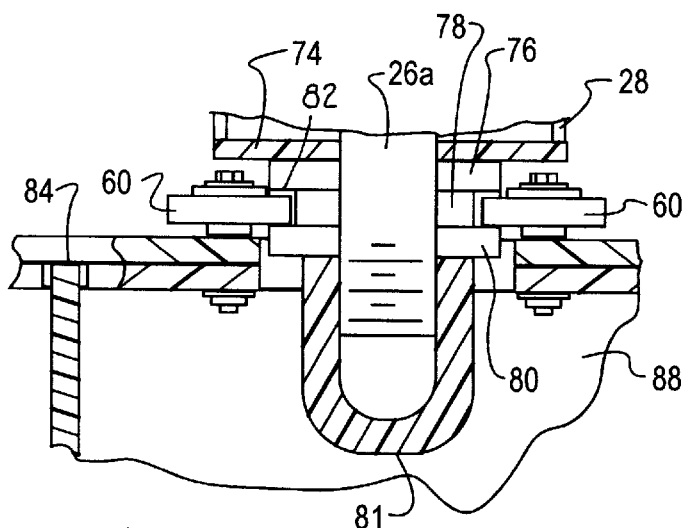
FIG. 7 is an enlarged view of another portion of FIG. 1.

FIGS. 1–7 present the general organization and arrangement of a rotary self-cleaning strainer 20 embodying principles of the invention. Strainer 20 comprises a central core 22 that has a longitudinal axis 24 and comprises a smaller diameter cylindrical supply pipe 26 and a larger diameter cylindrical suction pipe 28. Supply pipe 26 comprises a straight section 26a that is coaxial with axis 24, an elbow 26b at the upper end of section 26a, and a short straight section 26c extending from elbow 26b perpendicular to axis 24. Section 26c passes through a hole 27 in the wall of suction pipe 28 with a close fit, and a lower end portion of section 26a passes with a close fit through a closure 74 that closes the lower end of suction pipe 28. Supply pipe 26 and suction pipe 28 are thereby effectively mounted together to form central core 22. Core 22 forms a stationary portion of strainer 20 on which a rotary portion 30 of strainer 20 is journaled for rotation about axis 24.

Rotary portion 30 is an assembly that comprises a spool-like frame 32 which supports a circular cylindrical strainer screen 34 coaxial with axis 24. Frame 32 comprises closures 40 and 42 at opposite axial ends for closing the otherwise open ends of screen 34. The two closures are secured in assembly relation, coaxial with axis 24, by a number of axially extending tie rod structures 44 that are spaced circumferentially around the frame. It is to be understood that the number and the specific constructions of tie rod structures in any given frame are apt to depend on the particular dimensional characteristics of the strainer. The illustrated frame also comprises a circular ring 46 that is disposed perpendicular to axis 24 midway between closures 40, 42.

Each tie rod structure 44 comprises a cylindrical metal tie rod 48 and two cylindrical spacer sleeves 50. One spacer sleeve 50 of each tie rod structure is disposed between closure 40 and ring 46 while the other is disposed between ring 46 and closure 42. The two spacer sleeves of each tie rod structure are not only in mutual alignment, but in alignment with holes in closures 40, 42 and in ring 46. A respective tie rod 48 passes through these aligned holes and the two spacer sleeves. The opposite axial ends of each tie rod 48 are threaded and protrude axially beyond the respective closure 40, 42 to provide for nuts 52 to be threaded onto them and tightened against the opposite faces of the closures on the exterior of strainer 20. Preferably, a metal washer 54 is disposed between each nut 52 and the corresponding closure face, and a locking device is also included. Such a locking device may be a non-metallic insert that is part of the nut (i.e. a nylon insert that makes the nut a locking nut) or a separate lock washer that is between the nut and the washer. Disposed within opposite ends of each spacer sleeve 50 are locator inserts 56 that serve to more accurately center each spacer sleeve with the corresponding tie rod.

Tightening of its nuts 52 tensions each metal tie rod 48, forcibly sandwiching the corresponding spacer sleeves 50 and ring 46 together between closures 40, 42. By making spacer sleeves 50 identical, they become interchangeable, and tolerance stack-ups can be minimized, facilitating fabrication procedures and allowing more consistent quality to be achieved in assembled frames.

If no intermediate rings, such as ring 46, are used in a frame, each tie rod assembly can comprise a single spacer sleeve of suitable length sandwiched between closures 40, 42. By utilizing metal tie rods that are threaded at both ends and nuts for fasteners, the frame can be assembled and disassembled at either axial end.

Each closure 40, 42 is constructed to have a circular shoulder 58 for locating and seating a corresponding circular axial end of screen 34 on the perimeter margin of the respective closure. Each closure could be fabricated from a single piece of material that is cut and/or machined to the final shape; however, fabrication from separate individual parts, such as the illustrated disks, may have certain advantages. Each closure 40, 42 is shown to comprise respective circular disks 40a, 40b; 42a, 42b cooperatively associated. The two disks of each pair have different outside diameters (O.D.'s), and they are disposed coaxially against each other in face-to-face relationship to cooperatively form the shoulder 58. The smaller O.D. disk 40b, 42b centers a respective axial end of screen 34 while the outer margins of the larger O.D. disks 40a, 42a axially capture the screen.

Journaling of the upper axial end of rotary portion 30 on central core 22 is accomplished by a number of circular wheels 60 that disposed on closure 40 in equally spaced apart relationship on a common imaginary circle centered at axis 24. The particular number of wheels used may depend on the size and capacity of the particular strainer. Each wheel is mounted on closure 40 for rotation about an axis that is parallel with axis 24 and set radially outward from the wall of suction pipe 28 in an amount substantially equal to the wheel's radius. In this way each wheel essentially tangentially engages the outer surface of the wall of the suction pipe.

Each wheel 60 is a non-metallic part having a circular through-hole at the center. The wheel mounting includes a non-metallic bushing 62 that is fitted to the wheel through-hole and that spaces the wheel axially from closure 40. Each bushing comprises a circular sleeve having a circular flange 64 at one axial end. Flange 64 spaces the respective wheel from the closure. The radially inner margin of closure 40 has through-holes spaced equally apart about axis 24 for the wheel mountings. Sealing of the inner margin of closure 40 to the wall of suction pipe 28 is accomplished by a circular sealing ring 66 that is placed over the outer axial face of closure 40 around suction pipe 28. Sealing ring 66 has three holes that align with the three wheel-mounting holes in the closure. Fasteners secure closure ring 66 and bushings 62 to closure 40.

Each fastener comprises a metal bolt 68 that has a head and a shank. A metal flat washer 69a and a slightly smaller metal lock washer 69b are disposed on the bolt shank between the bolt head and the end of bushing 62 opposite flange 64. The shank passes from the bolt head through the two washers, the bushing, the closure, and the sealing ring in that order. A washer 70 and a nut 72, preferably including a locking device such as described earlier for the tie rod structures, are associated with the free end of the bolt shank. The tightening of nut 72 tensions the bolt shank, drawing bushing 62 and sealing ring 66 against opposite faces of closure 40. By making the axial length of bushing 62 beyond flange 64 just slightly greater than the axial length of the wheel's through-hole, a mounted wheel 60 can turn freely on the bushing without excessive axial play.

This arrangement provides low-friction journaling of one axial end of rotary portion 30 on central core 22. It also provides an effective seal for preventing material that should be strained by screen 34 from intruding between pipe 28 and closure 40 instead of passing through the screen.

Another set of wheels 60 journals the lower axial end of rotary portion 30 on central core 22. These wheels are mounted on closure 42 in the same manner as wheels 60 on closure 40, but instead of journaling rotary portion 30 on suction pipe 28, they journal rotary portion 30 on supply pipe 26. The lower axial end of suction pipe 28 is closed by the closure 74 which has a hole in its center allowing the lower end portion of supply pipe 26 to pass through. A set of three circular rings 76, 78, 80 is disposed, in that order, on the lower end portion of supply pipe 26 immediately below closure 74.

Rings 76, 80 axially capture ring 78 between them, and the latter ring 78 is of smaller outside diameter than the former two. This set of rings forms a radially outward open circular groove 82 bounded axially by confronting surface portions of rings 76, 80. The wheels 60 mounted on closure 42 ride in groove 82, and the illustrated embodiment comprises, by way of example, three such wheels at 120 degree intervals about axis 24. Each wheel is mounted on closure 42 for rotation about an axis that is parallel with axis 24 and set radially outward from the O.D. of ring 78 in an amount substantially equal to the wheel's radius. In this way each wheel essentially tangentially engages the outer surface of ring 78. The axial distance separating rings 76, 80 is set by the thickness of ring 78 and is just slightly greater than the wheel thickness so that each wheel is axially captured by rings 76, 80 free of binding, but without excessive play. This provides running clearance for wheels 60, with the rings 76, 80 radially overlapping a limited portion of each wheel sufficient to axially capture the rotary portion of the strainer on the stationary central core.

The set of three rings 76, 78, 80 is axially captured on supply pipe 26 between closure 74 and an end cap 81 that is threaded onto the free end of supply pipe 26. At its center, a portion of closure 42 has a through-hole large enough not to interfere with either supply pipe 26 or end cap 81 so as to allow the end cap to be tightened onto the supply pipe and forcefully hold the set of rings 76, 78, 80 against closure 74, but without impairing the free-running of the wheels in groove 82.

Closure 42 comprises a third disk 42c. Disks 42a, 42b cooperatively form shoulder 58, as described above. The through-hole in the center of disk 42a is sufficiently small to allow the disk's inner margin to radially overlap disk 42b, but sufficiently large to allow disk 42c to fit concentrically within it, separated from it by a circular groove 84. Groove 84 is open in the downward direction, but bounded by disk 42b in the opposite one. It is to be noticed that both disks 42b, 42c have registered hole patterns for mounting of wheels 60 on closure 42. Closure 42 includes a bottom end cover 86 covering end cap 82. Cover 86 comprises a circular cylindrical side wall 88, one end of which fits into groove 84 to abut disk 42b. A circular end wall 90 bears against, and closes the opposite end of, side wall 88.

End wall 90 comprises several through-holes that align with tapped holes 91 in disk 42c that are circumferentially offset from the wheel mounting holes. The threaded shanks of headed fasteners 92 pass through the holes in end wall 90 and into the threaded holes in disk 42c. Tightening of fasteners 92 sandwiches side wall 88 between end wall 90 and disk 42c to secure end cover 86 in place. The surface-to-surface abutment of end wall 90 against side wall 88 and of side wall 88 against disk 42b should be sufficient to prevent material that should be strained by screen 34 from intruding through closure 42.

In use, strainer 20 is supported in generally upright orientation in any suitable manner. The outer end of supply pipe section 26c is connected to a source of pressurized water (not shown) for operating strainer 20. In the fully upright position of strainer 20 depicted by the drawing, the full weight of rotary portion 30 is transmitted onto central core 22 by virtue of the lower set of wheels 60 resting on ring 80 where the wheels overlap the ring. If the strainer is not fully upright, a portion of the weight of the rotary portion is transmitted onto central core 22 via the upper set of wheels. When strainer 20 is immersed in a body of liquid however, a buoyant force attenuates the force of gravity.

Suction pipe 28 comprises a discharge 98 that is for connection to a suction source (not shown) when strainer 20 is in use. The typical suction source is a pump that is driven by an electric motor. Discharge 98 is connected through a conduit (not shown) to the suction side of the pump. There is typically a tap at the pressure side (outlet) of the pump that is connected by a conduit (not shown) back to pipe section 26c to deliver pressurized water to supply pipe 26.

Suction pipe 28 further comprises an intake via which water enters after having been sucked through screen 34. This intake comprises a number of holes 100 extending through the side wall of suction pipe 28 between closures 40, 42. In the illustrated embodiment of strainer, holes 100 are circular and arranged in several rows extending around the circumference of the suction pipe. They provide sufficient intake area for the particular diameter of suction pipe, yet do not impair the pipe's strength for the intended purpose of the pipe in the strainer.

Holes 100 also provide for branch pipes 104 to pass radially through suction pipe 28 from supply pipe 26 toward screen 34. The inner ends of pipes 104 tap into holes in the wall of supply pipe section 26a. The outer ends of branch pipes 104 are angled to their inner ends. Nozzles 106 attach to the outer ends of branch pipes 104, and they are aimed at non-perpendicular angles to a tangent to screen 34 about axis 24.

When pressurized water is delivered to supply pipe 26, it is distributed to branch pipes 104 and emitted from nozzles 106 as streams having both circumferential and radial flow components about axis 24. These streams simultaneously serve the dual purposes of rotating rotary portion 30 about central core 22 and of cleaning screen 34 by forcefully dislodging adhering debris from the outside of the screen.

Various parts of strainer 20 are fabricated from readily available materials. The various pipes are fabricated from conventional PVC pipe. The nozzles are plastic.

Sealing ring 66 has a radial split that intercepts one of its through-holes via which it is fastened to the strainer. This can facilitate placement of the sealing ring around the suction pipe, and the use of a washer 70 to overlap both sides of the split assures that in use, the ring will not warp at the split.

Figure 8:
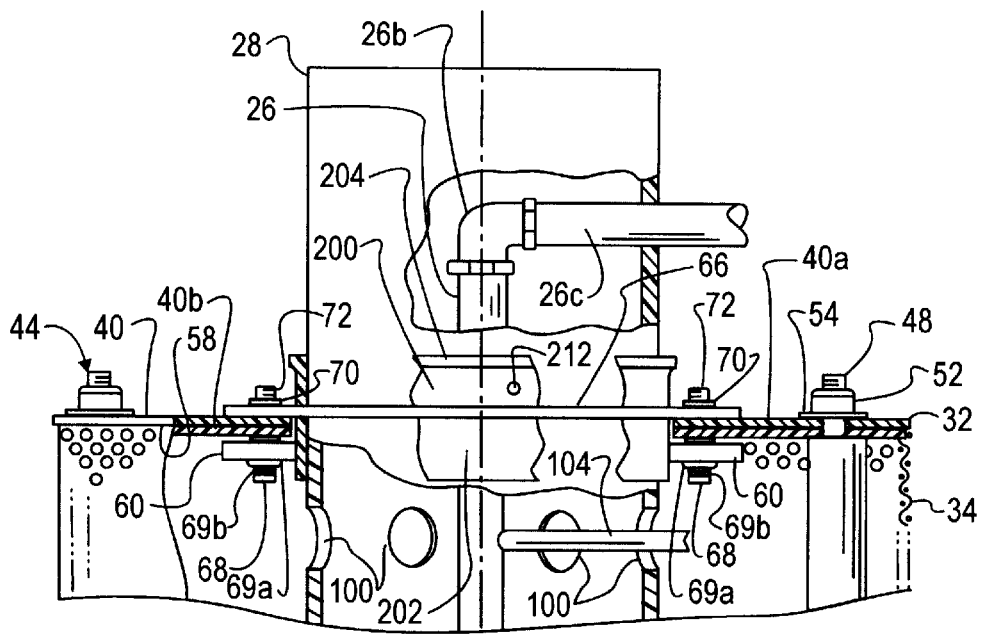
FIG. 8 is a fragmentary view of a portion of FIG. 1 showing a modification.
Figure 9:
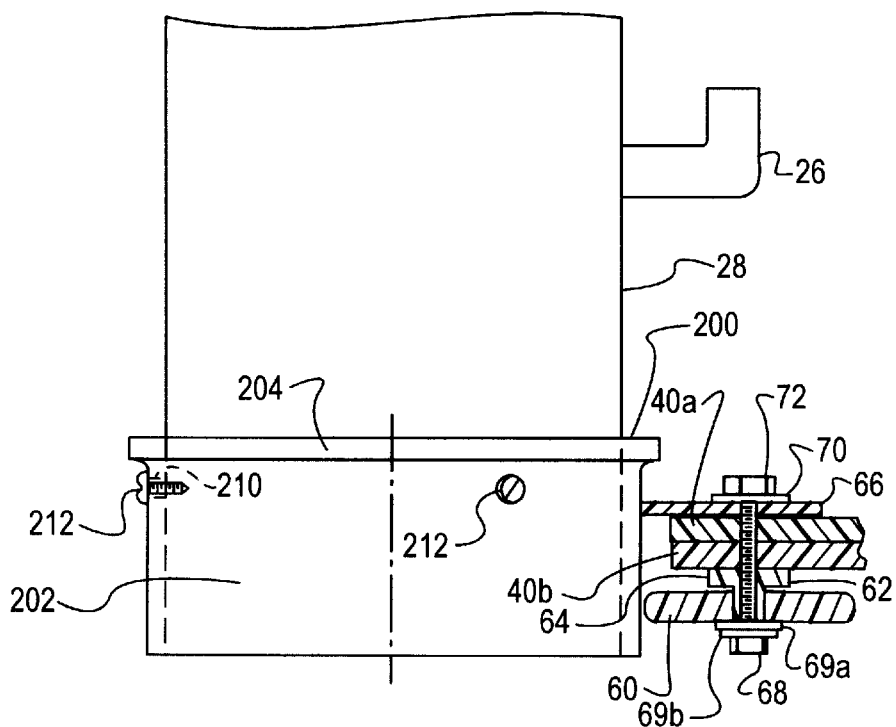
FIG. 9 is an enlarged view of FIG. 8 to show more detail.

FIGS. 8 and 9 show a modified form of strainer. The modification comprises the inclusion of a wear sleeve 200 around the outside of suction pipe 28 proximate the upper end of the strainer. Wear sleeve 200 is a ring that has a circular cylindrical side wall 202 for fitting snugly around suction pipe 28. A lip 204 is provided at the upper axial end of side wall 202, and is believed to provide a beneficial stiffening for the wear sleeve that may assist in maintaining its circularity. When the wear sleeve is placed over the suction pipe, lip 204 is on the exterior of the strainer, external to screen 34, and side wall 202 extends into the interior of the strainer, internal to screen 34, where wheels 60 can ride on the outer surface of the wear sleeve.

The inside diameter of wear sleeve 200 is just slightly greater than the outside diameter of suction pipe 28. Should the suction pipe be slightly out of round, but still allow wear sleeve 200 to be placed over it, wear sleeve 200 may also serve to correct that condition at least to some degree because it has relatively greater stiffness. FIG. 9 shows an attachment of the wear sleeve to the suction pipe which is believed quite effective. At one or more circumferential locations around the wear sleeve, a clearance hole 210 is provided in side wall 202. The threaded shank of a headed screw 212 is passed through hole 210 and into the wall of the suction pipe. As the screw is tightened, the screw head bears against side wall 202 and tends to draw the wall of the suction pipe outward.

Wheels 60, bushings 62, and wear sleeve 200 are preferably injection molded parts made from an acetal homopolymer resin. That material possesses physical properties that make the resulting parts durable in many applications where the inventive strainer is intended to be used. Examples of these beneficial properties include dimensional stability, wear and abrasion resistance, low coefficient of friction, low moisture absorption, and strength. Rings 76 and 80 are advantageously fabricated from HMW (high molecular weight) polyethylene, and ring 78 from UHWM (ultra high molecular weight) polyethylene.

While a presently preferred embodiment of the invention has been illustrated and described, it should be appreciated that principles of the invention are applicable to other embodiments within the scope of the following claims.

What is claimed is:

1. A rotary self-cleaning strainer adapted for connection to a suction pump and immersion in debris-containing liquid to prevent debris in the liquid from being sucked along with the liquid into the pump, the strainer comprising a cylindrical central core having an imaginary longitudinal axis and comprising a suction pipe having an intake and a discharge at spaced locations along its length and a supply pipe extending coaxially through the suction pipe, the discharge serving to communicate the suction pipe to the pump and the intake serving to communicate the suction pipe to the liquid, a cylindrical screen for straining the debris from the liquid, a frame for supporting the screen coaxially about and in outwardly spaced relation to the central core, the frame comprising respective end closures closing axially opposite ends of the screen to the central core, each respective end closure comprising a respective set of wheels journaling the frame on the central core for coaxial rotation about the central core, one or more apertures through the side wall of the suction pipe, one or more pipe structures tapped into the supply pipe, extending through the one or more apertures and terminating in nozzles directed toward the screen for both cleaning and rotating the screen by fluid that is fed through the supply pipe and the pipe structures and emitted at the nozzles, and two rings disposed coaxially on the central core and radially overlapping at least some of the wheels thereby axially capturing the frame on the central core.

2. A rotary self-cleaning strainer as set forth in claim 1 in which the wheels on a first of the end closures journal the frame on the suction pipe and the wheels on a second of the end closures journal the frame on the supply pipe.

3. A rotary self-cleaning strainer as set forth in claim 2 in which the two rings are disposed on the supply pipe and axially capture the wheels on the second end closure.

4. A rotary self-cleaning strainer as set forth in claim 3 further including a third ring disposed on the supply pipe between the first two rings such that the three rings cooperatively form a radially outwardly open groove, and the wheels on the second closure tangentially contact the third ring.

5. A rotary self-cleaning strainer as set forth in claim 4 in which the three rings are disposed as respective separate parts on the supply pipe.

6. A rotary self-cleaning strainer as set forth in claim 4 in which a threaded cap is threaded onto an end of the supply pipe to close that end of the supply pipe and to forcefully sandwich the three rings together against a transverse surface that is disposed in a fixed axial position on the central core, the groove providing running clearance for the wheels on the second end closure.

7. A rotary self-cleaning strainer as set forth in claim 6 in which the transverse surface that is disposed in a fixed axial position on the central core comprises an end wall of the suction pipe.

8. A rotary self-cleaning strainer as set forth in claim 6 in which the second end closure comprises a through-hole via which the cap can be installed onto and removed from the supply pipe and an axial end face that faces axially away from the screen and that contains a groove circumscribing the axis, and further including a cover that has a rim fitting into the groove in the second end closure and that covers the through-hole in the second end closure and the cap on the supply pipe.

9. A rotary self-cleaning strainer as set forth in claim 8 in which the cover comprises a circular side wall having opposite axial ends, one of which is the rim that fits in the groove in the second end closure, and a circular end wall closing the opposite axial end of the circular side wall, and further including fasteners extending between the cover end wall and the second end closure removably holding the cover on the second end closure.

10. A rotary self-cleaning strainer as set forth in claim 8 in which the second end closure comprises three annular disks assembled together coaxially about the axis, a first and a second of the annular disks cooperatively locating an axial end of the screen, the second of the annular disks circumscribing a third of the annular disks, the second and third of the annular disks being disposed axially against the first annular disk, and the three annular disks cooperatively defining the groove in the second end closure.

11. A rotary self-cleaning strainer as set forth in claim 3 further including a wear ring disposed around the suction pipe, and in which the wheels on the first end closure tangentially contact the wear ring.

12. A rotary self-cleaning strainer as set forth in claim 11 in which the wheels on the first end closure are disposed on an axial face of the first end closure that faces the second end closure, and the first end closure includes an annular disk disposed about the central core and spaced from the suction pipe by a radial gap, and a seal ring disposed on an axial face of the first end closure opposite the second end closure and extending across the radial gap between the annular disk and the suction pipe.

13. A rotary self-cleaning strainer as set forth in claim 2 in which the wheels on the second end closure are identical and are centered on a common imaginary circle about the axis.

14. A rotary self-cleaning strainer as set forth in claim 1 in which the frame further comprises tie rod structures circumferentially spaced about the axis and extending axially between outer margins of the end closures, each tie rod structure comprising at least one tubular spacer for bearing against the end closures, a tensioned fastener extending between the end closures through the at least one spacer of the respective tie rod structure forcing the end closures against the respective at least one spacer, and centering inserts disposed in the at least one spacer of each tie rod structure for centering the respective tensioned fastener within the respective at least one spacer.

15. A rotary self-cleaning strainer as set forth in claim 14 in which the frame further comprises a ring disposed axially between the end closures, each tensioned fastener passing through a respective hole in the frame ring, and each tie rod structure comprising first and second tubular spacers disposed on respective axially opposite faces of the frame ring and being forced against the frame ring by the respective tensioned fastener, each first and second tubular spacer comprising a respective centering insert proximate the frame ring.

16. A rotary self-cleaning strainer adapted for connection to a suction pump and immersion in debris-containing liquid to prevent debris in the liquid from being sucked along with the liquid into the pump, the strainer comprising a cylindrical central core having an imaginary longitudinal axis and comprising a suction pipe having an intake and a discharge at spaced locations along its length and a supply pipe extending coaxially through the suction pipe, the discharge serving to communicate the suction pipe to the pump and the intake serving to communicate the suction pipe to the liquid, a cylindrical screen for straining the debris from the liquid, a frame for supporting the screen coaxially about and in outwardly spaced relation to the central core, the frame comprising respective end closures closing axially opposite ends of the screen to the central core, each respective end closure comprising a respective set of wheels journaling the frame on the central core for coaxial rotation about the central core, one or more apertures through the side wall of the suction pipe, one or more pipe structures tapped into the supply pipe, extending through the one or more apertures and terminating in nozzles for dislodging debris from the screen for and rotating the screen by fluid that is fed through the supply pipe and the pipe structures and emitted at the nozzles, a first ring of a material different from that of the suction pipe disposed around the suction pipe, a second ring of a material different from that of the supply pipe disposed around the supply, the wheels on a first of the end closures riding on the first ring to journal the frame on the suction pipe, and the wheels on a second of the end closures riding on the second ring to journal the frame on the supply pipe.

17. A rotary self-cleaning strainer as set forth in claim 16 including two additional rings on the central core axially capturing at least some of the wheels to axially capture the frame on the central core.

18. A rotary self-cleaning strainer as set forth in claim 17 in which the two additional rings are disposed on the supply pipe to axially capture the wheels on the second end closure.

19. A rotary self-cleaning strainer adapted for connection to a suction pump and immersion in debris-containing liquid to prevent debris in the liquid from being sucked along with the liquid into the pump, the strainer comprising a cylindrical central core having an imaginary longitudinal axis and comprising a suction pipe having an intake and a discharge at spaced locations along its length and a supply pipe extending coaxially through the suction pipe, the discharge serving to communicate the suction pipe to the pump and the intake serving to communicate the suction pipe to the liquid, a cylindrical screen for straining the debris from the liquid, a frame for supporting the screen coaxially about and in outwardly spaced relation to the central core, the frame comprising respective end closures closing axially opposite ends of the screen to the central core and journaling the frame on the central core for coaxial rotation about the central core, one or more apertures through the side wall of the suction pipe, one or more pipe structures tapped into the supply pipe, extending through the one or more apertures and terminating in nozzles directed toward the screen for both cleaning and rotating the screen by fluid that is fed through the supply pipe and the pipe structures and emitted at the nozzles, the frame further comprising tie rod structures circumferentially spaced about the axis and extending axially between outer margins of the end closures, each tie rod structure comprising at least one tubular spacer for bearing against the end closures, a tensioned fastener extending between the end closures through the at least one spacer of the respective tie rod structure forcing the end closures against the respective at least one spacer, and centering inserts disposed in the at least one spacer of each tie rod structure for centering the respective tensioned fastener within the respective at least one spacer.

20. A rotary self-cleaning strainer as set forth in claim 19 in which the frame further comprises a ring disposed axially between the end closures, each tensioned fastener passing through a respective hole in the frame ring, and each tie rod structure comprising first and second tubular spacers disposed on respective axially opposite faces of the frame ring and being forced against the frame ring by the respective tensioned fastener, each first and second tubular spacer comprising a respective centering insert proximate the frame ring.

\* \* \* \* \*